United States Patent [19]

St. Coeur et al.

[11] Patent Number: 6,048,610

[45] Date of Patent: Apr. 11, 2000

[54] PRIMER COATING FOR POLYOLEFIN-BACKED TAPES

[75] Inventors: Richard St. Coeur, Marysville; William E. Hatfield; John Tynan, both of Port Huron, all of Mich.

[73] Assignee: Intertape Polymer Group, Inc., Marysville, Mich.

[21] Appl. No.: 08/962,192

[22] Filed: Oct. 31, 1997

[51] Int. Cl.[7] .............................. B32B 7/10; B32B 7/12; B32B 27/08; B32B 27/32

[52] U.S. Cl. .................... 428/352; 428/341; 428/41.8; 428/353; 428/354; 428/355 EN; 428/355 BL; 428/515; 428/516; 428/517; 428/519; 428/521; 428/523; 427/208.4; 427/208.8; 427/385.5; 427/393.5; 427/412.3; 525/70; 525/71; 525/76; 525/86; 525/88; 525/90; 525/98

[58] Field of Search .............................. 428/355 R, 353, 428/352, 355 EN, 355 AC, 355 BL, 515, 522, 519, 520, 521, 516, 517, 40.1, 41.8, 354, 523, 340, 341; 427/208.4, 208.8, 384, 385.5, 393.5, 407.1, 412.1, 412.3; 525/70, 71, 76, 86, 88, 90, 98

[56] References Cited

U.S. PATENT DOCUMENTS

| | | | |
|---|---|---|---|
| 4,070,421 | 1/1978 | Etter, Jr. ................................. | 260/897 |
| 4,578,429 | 3/1986 | Gergen et al. ........................... | 525/291 |
| 4,692,357 | 9/1987 | Mayumi et al. ......................... | 427/393 |
| 4,725,454 | 2/1988 | Galli et al. .............................. | 427/208 |
| 4,755,553 | 7/1988 | Kishimura et al. ..................... | 524/531 |
| 4,954,573 | 9/1990 | Fry et al. ............................. | 525/327.6 |
| 4,966,947 | 10/1990 | Fry et al. ............................. | 525/327.6 |
| 5,102,944 | 4/1992 | Ohmika et al. ......................... | 524/501 |
| 5,180,776 | 1/1993 | Kitayama et al. ........................ | 525/64 |
| 5,227,198 | 7/1993 | Laura et al. ............................. | 427/373 |
| 5,248,364 | 9/1993 | Liu et al. ................................ | 156/244 |
| 5,378,746 | 1/1995 | Beyrle et al. ........................... | 524/114 |
| 5,385,979 | 1/1995 | Ozawa et al. ........................... | 525/145 |
| 5,425,969 | 6/1995 | Wakabayashi et al. ................. | 427/470 |
| 5,451,440 | 9/1995 | Tynan, Jr. ................................. | 428/40 |
| 5,480,939 | 1/1996 | Jackson et al. ......................... | 525/120 |

*Primary Examiner*—Vivian Chen
*Attorney, Agent, or Firm*—Thompson Hine & Flory LLP

[57] ABSTRACT

A primer coating composition for use in polyolefin-backed pressure sensitive tape comprising a maleic anhydride modified chlorinated polyolefin covalently bonded to a maleic anhydride modified A-B-A block copolymer, where A is a thermoplastic polystyrene and B is a rubber midblock, by means of a crosslinking agent capable of reacting with the maleic anhydride functional groups in said polyolefin and said block copolymer a polyolefin-backed pressure sensitive tape employing the primer coating composition; and a method for manufacturing a polyolefin-backed pressure sensitive tape employing the primer coating composition are described.

28 Claims, No Drawings

PRIMER COATING FOR POLYOLEFIN-BACKED TAPES

BACKGROUND OF THE INVENTION

The present invention relates to a primer composition for coating polyolefin-backed pressure sensitive tapes to improve the bond between the polyolefin substrate and the adhesive.

Polyolefins, particularly polypropylene, are useful as a backing material for pressure sensitive tape. However, polyolefins typically have a very low surface energy making it difficult to securely apply a coating such as a pressure sensitive adhesive (PSA) to the surface of the polyolefin substrate. Traditionally, the surface of the polyolefin substrate is treated with, for example, corona discharge to increase the surface energy of the substrate. This treatment improves the bond between adhesive and substrate, but only to a limited degree.

Chlorinated polyolefin primer coatings have also been employed in polypropylene backed pressure sensitive adhesive tape. While these primer coatings adhere well to the polypropylene substrate, they do not bond well to the pressure sensitive adhesives. Accordingly, it is desirable to provide a polypropylene backed pressure sensitive adhesive tape which exhibits improved bonding between the polypropylene substrate and the pressure sensitive adhesive.

SUMMARY OF THE INVENTION

In accordance with the invention, a primer coating composition for use in a polyolefin-backed pressure sensitive adhesive tape comprises a maleic anhydride functionalized chlorinated polyolefin, a maleic anhydride functionalized thermoplastic copolymer, and at least one crosslinking agent. The chemical composition of the maleic anhydride functionalized chlorinated polyolefin and maleic anhydride functionalized thermoplastic copolymer are dissimilar and it is assumed that in the film-forming reaction process, similar groups associate and subsequently form a bilayered film. In this bilayered film, the maleic anhydride functionalized chlorinated polyolefin significantly improves adhesion of the primer to the polyolefin substrate and the maleic anhydride functionalized thermoplastic copolymer significantly improves adhesion of the primer to the pressure sensitive adhesive, thereby providing a polyolefin-backed pressure sensitive tape where the adhesive is securely bound to the polyolefin substrate.

According to the invention the maleic anhydride functional groups of the chlorinated polyolefin and the thermoplastic copolymer react with the crosslinking agent(s).

Accordingly, it is an object of the invention to provide a polyolefin-backed pressure sensitive adhesive tape having a substantially improved bond between the backing layer and the adhesive.

It is another object of the invention to provide a primer coating composition applied between the polyolefin backing and the adhesive wherein bonding of the adhesive to the backing is substantially improved.

It is yet another object of the invention to provide a method for manufacturing a polyolefin-backed pressure sensitive adhesive tape wherein the bond between the backing and the adhesive is substantially improved.

DETAILED DESCRIPTION OF THE INVENTION

The primer coating composition of the invention comprises a maleic anhydride functionalized chlorinated polyolefin covalently bonded to a maleic anhydride functionalized thermoplastic copolymer by reacting the maleic anhydride functional groups on the chlorinated polyolefin and the thermoplastic copolymer with at least one crosslinking compound so that the maleic anhydride functionalized chlorinated polyolefin and the maleic anhydride functionalized thermoplastic copolymer form a crosslinked layer. The primer coating composition is useful in the application of various coatings to a substrate having a very low surface energy such as polyolefin films. The bilayer primer coating composition is particularly useful in polypropylene-backed pressure sensitive adhesive tapes to improve the bond between the polypropylene backing and the adhesive.

Typically, the polyolefin-backed pressure sensitive adhesive tape is manufactured by applying, to one surface of a polyolefin substrate, a primer coating composition which comprises a maleic anhydride functionalized chlorinated polyolefin, a maleic anhydride functionalized thermoplastic copolymer, and at least one crosslinking compound wherein the maleic anhydride functional groups on the chlorinated polyolefin and the thermoplastic copolymer react with the crosslinking compound(s) such that the maleic anhydride functionalized chlorinated polyolefin is covalently bonded to the maleic anhydride functionalized thermoplastic copolymer and applying a pressure sensitive adhesive to the polyolefin substrate such that the primer coating composition resides between the polyolefin substrate and the pressure sensitive adhesive. Typically, the primer coating composition comprises about 20 to 80 dry wt % maleic anhydride functionalized chlorinated polyolefin about 20 to 80 dry wt % maleic anhydride functionalized thermoplastic copolymer and ±40% of a stoichiometric ratio of crosslinking compound to maleic anhydride reactive sites. The primer coating can be applied to the polyolefin substrate in accordance with standard procedures for example by using a rotogravure coater. Preferably, the primer coating is applied to the polyolefin substrate at a coat weight of about 0.5 to 3.0 lbs./ream (3000 ft).

The chlorinated polyolefinic component of the maleic anhydride functionalized chlorinated polyolefin is intended to include chlorinated polyethylene, chlorinated polypropylene, chlorinated polybutene, and the like. It may be desirable to choose the maleic anhydride functionalized chlorinated polyolefin based upon the substrate or backing for the pressure sensitive tape. For example, a maleic anhydride functionalized chlorinated polyethylene might be used with a polyethylene support. Typically, the maleic anhydride functionalized chlorinated polyolefin will contain about 0.1 to 10 wt % maleic anhydride [or other measure of functionality], have a chlorine content of about 10 to 50 wt % and have a molecular weight in the range of about 1,000 to 500,000. Representative examples of maleic anhydride modified chlorinated polyolefins include Hypalon CP 826 available from DuPont and Eastman CP-343-1 available from Eastman Chemical Company.

The maleic anhydride functionalized thermoplastic copolymer component should be compatible with the adhesive used in the pressure sensitive adhesive tape of the invention and, typically, includes an A-B-A block copolymer where A represents a thermoplastic polystyrene and B represents a rubber midblock of polyisoprene, polybutadiene, poly (ethylene/butylene), etc. Typically the maleic anhydride functionalized thermoplastic polymer contains about 1 to 5 wt % maleic anhydride. A particularly useful functionalized thermoplastic copolymer is Kraton FG1901X, a maleic anhydride functionalized rubber available from Shell Development Co., Houston, Tex.

In addition to the maleic anhydride functionalized chlorinated polyolefin and the maleic anhydride functionalized thermoplastic copolymer, the primer coating composition contains at least one crosslinking agent capable of reacting with the maleic anhydride functionality. As crosslinking agents, polyfunctional isocyanates such as methanediphenyl diisocyanate, toluene diisocyanate, polyaromatic polyisocyanates, polyether polyisocyanates (mean molecular weight of about 700–5,000), polyester polyisocyanates (mean molecular weight of about 700–5,000), polyamines such as diethylene triamine, triethylene tetramine, N-aminoethyl piperadine, diaminophenyl methane, metaphenylene diamine, polyamide resins having an amine value of about 200 to 400, melamines such as trimethylol melamine, hexamethylol melamine, alkylated methylol melamines (e.g., methyl-methylol melamine, ethyl-methylol melamine or butylmethylol melamine), polyfunctional epoxy resins having a mean molecular weight of 800 to about 4,000, a softening point of about 60° to about 160° C. and an epoxy equivalent of about 400 to about 3,000 can be used. The crosslinking agent is present in the primer coating composition in an amount to provide an effective crosslinking bond between the maleic anhydride functionalized chlorinated polypropylene and the maleic anhydride functionalized thermoplastic copolymer. Typically, the crosslinking agent is present in an amount of about ±40% of a stoichiometric ratio of crosslinking compound to maleic anhydride reactive sites.

In a preferred aspect of the invention the primer coating composition contains an activator which improves the crosslinking reaction. Useful activators include para-toluene sulfonic acid, hydrochloric acid, phosphoric acid or any Bronsted acid that is capable of lowering the pH of the coating to a value of 0.5–5.0.

The substrate of the pressure sensitive tape may be any of the materials commonly used in the industry and typically include biaxially oriented polypropylene (BOPP), machine direction oriented polypropylene (MOPP), polyethylene, polyethylene terephtlalate (PET), and the like. Preferably, the support is biaxially oriented polypropylene or machine direction oriented polypropylene. Conventional pressure-sensitive adhesives can be used in the tape of this invention. A representative example of a suitable adhesive is described in U.S. Pat. No. 3,239,478, incorporated herein by reference.

EXAMPLE

In a typical example of the polyolefin-backed pressure sensitive adhesive tape of the invention, a 4.0 mil machine directed polypropylene (MOPP) backing is coated with a primer coating composition by using a rotogravure coating method. The primer coating contains 6.20 wt % Hypalon™ CP826 (a maleic anhydride modified chlorinated polypropylene from DuPont), 89.81 wt % toluene, 3.10 wt % Cymel™ 303 (a melamine crosslinking agent from American Cyanamid), 3.10 wt % Kraton FG 1901 X (a maleic anhydride modified styrene-ethylene/butadiene-styrene (S-EB-S block copolymer rubber from Shell), 0.26 wt % para-toluene sulfonic acid, and 0.63 wt % of Rubinate M (a polymeric MDI available from ICI Polyurethanes, used as a secondary crosslinking agent). The coating is dried in an oven at 150° F. for 30–90 seconds prior to application of adhesive. A layer of SIS block copolymer pressure sensitive adhesive is coated on to the primer coated polypropylene substrate via knife over roll coating, at a target coat weight of 25 lbs./ream (3000 ft).

Having described the intention in detail and by reference to the particular embodiments thereof, it will be apparent that numerous modifications and variations are possible without departing from the scope of the invention as defined by the following claims.

What is claimed is:

1. A primer coating composition for use in polyolefin-backed pressure sensitive adhesive tape, said composition comprising a maleic anhydride functionalized chlorinated polyolefin, a maleic anhydride functionalized A-B-A block copolymer where A is a thermoplastic polystyrene and B is a rubber midblock, and a crosslinking agent capable of reacting with the maleic anhydride functional groups in said polyolefin and said block copolymer.

2. The composition as claimed in claim 1 wherein said maleic anhydride functionalized chlorinated polyolefin provides adhesion to a backing of the polyolefin-backed pressure sensitive adhesive tape, and wherein said maleic anhydride functionalized A-B-A block copolymer provides adhesion to the adhesive on the tape.

3. The composition as claimed in claim 1 wherein said crosslinking agent is a melamine-formaldehyde resin, a polyfunctional isocyanate, a polyamide resin, or a polyfunctional epoxy resin.

4. The composition as claimed in claim 1 wherein the composition additionally contains an activator.

5. The composition as claimed in claim 4 wherein said activator is a Browsted acid that is capable of lowering the pH of the composition to a value of 0.5 to 5.0.

6. The composition as claimed in claim 1 wherein the composition comprises about 20 to 80 wt % maleic anhydride functionalized chlorinated polyolefin, about 20 to 80 wt % maleic anhydride functionalized A-B-A block copolymer and about ±40% of a stoichiometric ratio of crosslinking agent to maleic anhydride reactive sites.

7. The composition as claimed in claim 1 wherein said maleic anhydride functionalized chlorinated polyolefin is a maleic anhydride functionalized chlorinated polypropylene.

8. The composition as claimed in claim 1 wherein said rubber midblock is selected from the group consisting of polyisoprene, polybutadiene and poly(ethylene/butylene).

9. The composition as claimed in claim 8 wherein said maleic anhydride functionalized A-B-A block copolymer contains about 1 to 5 wt % maleic anhydride and said functionalized chlorinated polyolefin contains about 0.1 to 10 wt % maleic anhydride.

10. A polyolefin-backed pressure sensitive adhesive tape comprising:

a polyolefin backing;

a release coating;

a pressure sensitive adhesive; and a primer coating located between said polyolefin backing and said pressure sensitive adhesive, where the primer coating comprises a maleic anhydride functionalized chlorinated polyolefin, a maleic anhydride functionalized A-B-A block copolymer where A is a thermoplastic polystyrene and B is a rubber midblock, and a crosslinking agent capable of reacting with the maleic anhydride functional groups in said polyolefin and said block copolymer.

11. The tape of claim 10, wherein said maleic anhydride functionalized chlorinated polyolefin provides adhesion to the polyolefin backing, and wherein said maleic anhydride functionalized A-B-A block copolymer provides adhesion to the adhesive.

12. The tape as claimed in claim 10 wherein said crosslinking agent is a melamine-formaldehyde resin, a polyfunctional isocyanate, a polyamide resin, or a polyfunctional epoxy resin.

13. The tape of claim 10 wherein the composition additionally contains an activator.

14. The tape of claim 13 wherein said activator is para-toluene sulfonic acid.

15. The tape of claim 10 wherein said maleic anhydride functionalized polyolefin is a maleic anhydride functionalized polypropylene.

16. The tape as claimed in claim 10 wherein the rubber midblock is selected from the group consisting of polyisoprene, polybutadiene and poly(ethylene/butylene).

17. The tape as claimed in claim 16 wherein said maleic anhydride functionalized A-B-A block copolymer contains about 1 to 5 wt % maleic anhydride and said functionalized chlorinated polyolefin contains about 0.1 to 10 wt % maleic anhydride.

18. A method of manufacturing a polyolefin-backed pressure sensitive adhesive tape comprising:

providing a polyolefin backing;

applying a release coating to a surface of the polyolefin backing;

applying to an opposing surface of the polyolefin backing a primer coating where the primer coating comprises a maleic anhydride functionalized chlorinated polyolefin, a maleic anhydride functionalized A-B-A block copolymer where A is a thermoplastic polystyrene and B is a rubber midblock, and a crosslinking agent which is capable of reacting with the maleic anhydride functional groups in said polyolefin and said block copolymer; and applying a pressure sensitive adhesive to the primer coating.

19. The method of claim 18 wherein said crosslinking agent is a melamine-formaldehyde resin, a polyfunctional isocyanate, a polyamine, a polyamide resin, or a polyfunctional epoxy resin.

20. The method of claim 18 wherein the reaction of said crosslinking compound is activated by an activator.

21. The method of claim 20 wherein said activator is para-toluene sulfonic acid.

22. The method of claim 20 wherein said primer coating comprises an activator that is capable of lowering the pH of the coating to a value of 0.5–5.0.

23. The method of claim 18 wherein a maleic anhydride functional group on said maleic anhydride functionalized chlorinated polyolefin and on said maleic anhydride functionalized A-B-A block copolymer react with said crosslinking agent to produce a crosslinked primer coating on the polyolefin-backed pressure sensitive adhesive tape.

24. The method of claim 18 wherein said primer coating comprises about 20 to 80 wt % maleic anhydride functionalized chlorinated polyolefin, about 20 to 80 wt % maleic anhydride functionalized A-B-A block copolymer, and a crosslinking agent in an amount of about ±40% of a stoichiometric ratio of crosslinking agent to maleic anhydride reactive sites.

25. The method of claim 18 wherein said maleic anhydride functionalized chlorinated polyolefin is a maleic anhydride functionalized chlorinated polypropylene.

26. The method of claim 18 wherein said primer coating composition is applied at a coat weight of about 0.5 to 3.0 lbs/Ream.

27. The method of claim 18 wherein said rubber midblock is selected from the group consisting of polyisoprene, polybutadiene and poly(ethylene/butylene).

28. The method of claim 27 wherein said maleic anhydride functionalized A-B-A block copolymer contains about 1 to 5 wt % maleic anhydride and said functionalized chlorinated polyolefin contains about 0.1 to 10 wt % maleic anhydride.

* * * * *